United States Patent
Landsmann et al.

(10) Patent No.: US 11,722,082 B2
(45) Date of Patent: Aug. 8, 2023

(54) METHOD AND DEVICE FOR CONTROLLING A SYNCHRONOUS MACHINE WITHOUT A POSITION SENSOR BY MEANS OF UNIQUE ASSIGNMENT OF THE FLUX LINKAGE TO THE ROTOR POSITION

(71) Applicant: KOSTAL Drives Technology GmbH, Luedenscheid (DE)

(72) Inventors: Peter Landsmann, Munich (DE); Sascha Kuehl, Munich (DE); Dirk Paulus, Munich (DE)

(73) Assignee: KOSTAL Drives Technology GmbH, Luedenscheid (DE)

( * ) Notice: Subject to any disclaimer, the term of this patent is extended or adjusted under 35 U.S.C. 154(b) by 0 days.

(21) Appl. No.: 17/747,054

(22) Filed: May 18, 2022

(65) Prior Publication Data

US 2022/0286071 A1  Sep. 8, 2022

Related U.S. Application Data

(63) Continuation of application No. PCT/EP2020/083056, filed on Nov. 23, 2020.

(30) Foreign Application Priority Data

Nov. 25, 2019 (EP) .................................. 19000531

(51) Int. Cl.
  *H02P 21/18* (2016.01)
  *H02P 25/089* (2016.01)

(52) U.S. Cl.
  CPC ............ *H02P 21/18* (2016.02); *H02P 25/089* (2016.02); *H02P 2203/05* (2013.01)

(58) Field of Classification Search
  CPC ..... H02P 21/18; H02P 25/089; H02P 2203/05
  See application file for complete search history.

(56) References Cited

U.S. PATENT DOCUMENTS 6,339,308 B2  1/2002  Shinnaka
6,910,389 B2  6/2005  Ho
(Continued)

FOREIGN PATENT DOCUMENTS

DE  102015217986 A1  3/2017
EP      1133050 B1  11/2005
(Continued)

OTHER PUBLICATIONS

European Patent Office, International Search Report for International Application No. PCT/EP2020/083056, dated Dec. 23, 2020.
(Continued)

*Primary Examiner* — Zoheb S Imtiaz
(74) *Attorney, Agent, or Firm* — Brooks Kushman P.C.

(57) ABSTRACT

A method is for use with a synchronous machine having a stator and a rotor with or without permanent magnets. In operation, electric current of the synchronous machine responsive to the synchronous machine being actuated via clocked terminal voltages is measured. A magnetic flux linkage is determined based on the clocked terminal voltages and the measured electric current. A profile of the magnetic flux linkage as a function of rotation of the rotor, under a boundary condition of an at least two-dimensional electric current vector that is unchanged in coordinates of the stator, is used to detect a position of the rotor. The synchronous machine is controlled according to the rotor position.

20 Claims, 8 Drawing Sheets

(56) References Cited

U.S. PATENT DOCUMENTS

| | | | |
|---|---|---|---|
| 7,026,772 B2 | 4/2006 | Quirion | |
| 8,008,878 B2 | 8/2011 | Goetz et al. | |
| 9,154,073 B2 | 10/2015 | Hammel et al. | |
| 9,479,102 B2* | 10/2016 | Park | H02P 21/141 |
| 10,378,475 B2* | 8/2019 | Denk | F02D 41/20 |
| 2009/0039810 A1 | 2/2009 | Gotz et al. | |
| 2013/0249448 A1* | 9/2013 | Kobayashi | H02P 21/141 |
| | | | 318/400.02 |
| 2014/0333240 A1* | 11/2014 | Kobayashi | H02P 29/662 |
| | | | 318/400.02 |
| 2016/0036364 A1* | 2/2016 | Yamazaki | H02P 21/12 |
| | | | 318/400.02 |
| 2020/0011449 A1* | 1/2020 | Jagoda | F16K 11/07 |

FOREIGN PATENT DOCUMENTS

| | | | |
|---|---|---|---|
| EP | 1513250 B1 | 3/2010 | |
| EP | 2036197 B1 | 4/2010 | |
| EP | 2023479 B1 | 4/2014 | |
| EP | 2493067 B1 | 4/2018 | |
| EP | 2474091 B1 | 7/2019 | |

OTHER PUBLICATIONS

The International Bureau of WIPO, International Preliminary Report on Patentability for International Application No. PCT/EP2020/083056 dated May 17, 2022.

* cited by examiner

METHOD AND DEVICE FOR CONTROLLING A SYNCHRONOUS MACHINE WITHOUT A POSITION SENSOR BY MEANS OF UNIQUE ASSIGNMENT OF THE FLUX LINKAGE TO THE ROTOR POSITION

CROSS-REFERENCE TO RELATED APPLICATIONS

This application is a continuation of International Application No. PCT/EP2020/083056, published in German, with an international filing date of Nov. 23, 2020, which claims priority to EP 19000531.4, filed Nov. 25, 2019, the disclosures of which are hereby incorporated in their entirety by reference herein.

TECHNICAL FIELD

The present invention relates to controlling and monitoring a synchronous machine without a position sensor or encoder.

BACKGROUND

Methods that enable efficient and high-performance (field-oriented, for example) closed-loop control of a synchronous machine (motor and/or generator) without position sensors (often referred to as "sensor-less" closed-loop control) are divided into two broad classes:

1. Fundamental wave methods (bibliography references [1], [2], [3], [4], [5], [6], [7], [8], [9], [10], [11], and [12]) evaluate the voltage induced by movement. At average and high rotational speeds, they provide very good signal properties, but they fail in the lower rotational speed range, in particular when the machine is at a standstill.

2. Anisotropy-based methods (bibliography references [13], [14], and [15]) evaluate the position dependency of the inductance of the machine, for which reason no rotational speed is necessary. However, they generally have poorer signal properties.

Sensor-less closed-loop control in the overall rotational speed range is therefore often implemented by a combination of both method classes—so-called hybrid sensor-less methods (bibliography references [16], [17], [18], [19], [20], [21], [22], and [23]). The present invention relates to the class of fundamental wave methods, regardless of whether the fundamental wave method is used separately or in hybrid operation.

Within the fundamental wave methods, a distinction may be made between the following sub-classes: (a) electromotive force (EMF)-based methods, for example by means of direct or filtered EMF evaluation (bibliography references [4], [6], [8], and [20]), Luenberger observer (bibliography references [16] and [18]), extended Kalman filter (bibliography reference [3]), or sliding mode observer (bibliography reference [2]); and (b) flux-based methods (bibliography references [1], [5], [9], [10], [11], [12], [17], [19], [21], [22], [23], and [24]). The present invention relates to the sub-class of flux-based fundamental wave methods. In the present description, the term "flux" is used as an abbreviated form for magnetic flux linkage.

In flux-based fundamental wave methods, the flux is initially obtained from the integral of the voltage (minus the ohmic component) as a function of time t:

$$\hat{\psi}_s^s = \int (u_s^s - R_s i_s^s) dt \qquad (1)$$

$u_s^s$ is the voltage of the stator winding (subscript s) represented in coordinates fixed to the stator (superscript s), $R_s$ is the resistance of the stator winding, $i_s^s$ is the current through the stator winding, and the caret ^ indicates that the value is estimated.

The open integration in equation (1) is subject to a drift problem (due to measuring errors such as DC components $i_s^s$), which is compensated for by expanding the integral by an additional term $u_c^s$:

$$\hat{\psi}_s^s = \int (u_s^s - R_s i_s^s + u_c^s) dt \qquad (2)$$

The additional term is a function of the deviation of the integrated flux $\hat{\psi}_s^s$ from a reference flux $\psi_{ref}^s$:

$$u_c^s = C(\psi_{ref}^s - \hat{\psi}_s^s) \qquad (3)$$

The function C generally involves a conventional closed-loop control rule (C for controller), and in the simplest form, a P controller (for example, bibliography references [5], [17], and [19]) or a PI controller (for example, bibliography references [9], [11], and [21]). The reference flux signal $\psi_{ref}^s$ may be generated via various principles, in the simplest form, as a zero vector $\psi_{ref}^s = 0$ (for example, bibliography references [5], [10], and [23]), or even better, via the quotient of the internal voltage and the estimated rotational speed, for example:

$$\psi_{ref}^s = -J \frac{(u_s^s - R_s i_s^s)}{\omega} \qquad (4)$$

The 90° rotation matrix J rotates a vector by 90° upon multiplication:

$$J = \begin{bmatrix} 0 & -1 \\ 1 & 0 \end{bmatrix} \qquad (5)$$

However, there are also variants in which the estimated rotor position information is also used for reference flux formation (bibliography references [9], [21], and [22]), or variants that select an independent principle for the reference flux formation (bibliography references [10] and [11]) or for stabilization (bibliography references [1] and [24]).

Figure 1:
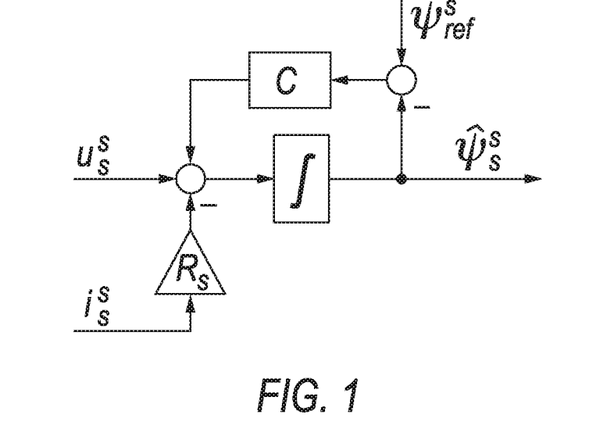
FIG. 1 illustrates a block diagram of a flux estimator with drift compensation.

In total, equations (1), (2), and (3) result in the customary structure of a flux estimator with drift compensation, which is illustrated in FIG. 1 (the generation of the reference flux $\psi_{ref}^s$ is not depicted due to the large number of possible alternatives).

After the instantaneous estimated flux value $\hat{\psi}_s^s$ is computed, according to a certain rule it is used, taking into account the instantaneous measured current $i_s^s$, to compute an estimated rotor position value $\hat{\theta}_r$, which forms the output signal of the sensor-less method and is fed back to the particular controllers (for the current controller, for the dq transformation, and derivation for the rotational speed controller). For this computation of $\hat{\theta}_r$, based on a summary of the literature, typically a scaled current vector $L_x i_s^s$ scaled with zero (bibliography references [1] and [5]), i.e., direct flux evaluation, or scaled with the q inductance $L_q$ (bibliography references [9] and [22]), or scaled with the average inductance $L_\Sigma$ (bibliography reference [11]), or scaled with a general inductance $L_s$ (bibliography references [21] and [23]), or scaled separately with $L_d$ and $L_q$ via feedback of $\hat{\theta}_r$ (bibliography reference [10]) is subtracted from the estimated flux value $\hat{\psi}_s^s$, and a rotor position value is assigned to the resulting differential flux vector.

In the following discussion, this assignment is explained in greater detail for two example approaches: active flux (bibliography references [9] and [22]) and fundamental saliency (bibliography reference [11]), to allow the shortcomings of this common procedure in the literature to be subsequently established.

In the active flux approach, the so-called active flux vector $\psi_A{}^s$ is computed, which for any machine type by definition is always aligned with the d-axis, and which may thus be used to directly compute the rotor position:

$$\hat{\theta}_r = \arg(\hat{\psi}_A{}^s) \tag{6}$$

This results in the estimated active flux vector $\hat{\psi}_A{}^s$ by subtracting the product of the absolute q inductance $L_q$ and the current $i_s{}^s$ from the estimated flux $\hat{\psi}_s{}^s$:

$$\hat{\psi}_A^s = \hat{\psi}_s^s - L_q i_s^s \tag{7}$$

$$\psi_A^r = \begin{bmatrix} \psi_{pm} + (L_d - L_q)i_d \\ 0 \end{bmatrix} \tag{8}$$

The superscript r is for representation in dq rotor coordinates. The subtraction is always the same, regardless of the selected coordinate system (superscript s, r, or other). In addition, absolute inductances $L_d$ or $L_q$ are generally defined as the quotient of the flux and the current:

$$L_d = \frac{\psi_d}{i_d} \tag{9}$$

$$L_q = \frac{\psi_q}{i_q} \tag{10}$$

For a nonlinear profile of the flux as a function of the current (magnetic saturation), always apply in each case for a current operating point f.

Figure 2:
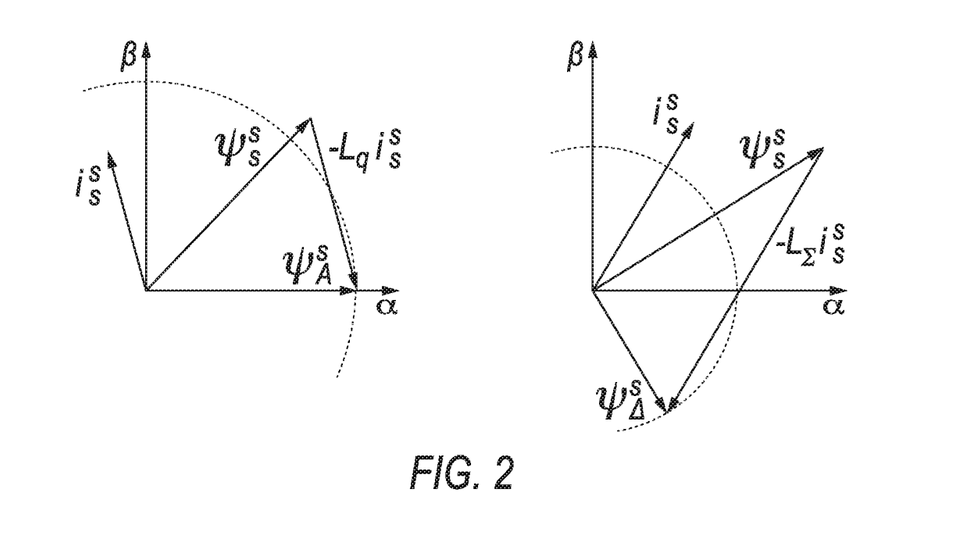
FIG. 2 includes a left-side drawing which illustrates a vector diagram of the active flux method and includes a right-side drawing which illustrates a vector diagram of the fundamental saliency method in stator coordinates for rotor position $\theta_r=0$, with the progression of the vectors $\psi_A^s$ or $\psi_\Delta^s$ as a function of the rotor rotation $\theta_r \neq 0$ (dotted-line circles), which is assumed by the respective method.

The computation of the active flux vector per equation (7) and angular dependency resulting from equation (8), which allows an angle computation according to equation (6), is graphically illustrated in the left-side drawing of FIG. 2 as a vector diagram for rotor position $\theta_r = 0$.

According to bibliography reference [9], the active flux approach is applicable not only to permanent magnet synchronous machines (PMSMs), but also to sensor-less closed-loop control of reluctance synchronous machines (RSMs). As the result of equation (8), without PM flux ($\psi_{pm} = 0$) the absolute value of the estimated active flux vector $\hat{\psi}_A{}^s$, and thus the signal content of such a rotor position assignment without d-current ($i_d = 0$), disappears (current operating points on the q-axis would not be possible).

Because bibliography reference [11] does not imply such a limitation, this so-called fundamental saliency approach is cited as a second option for computing the rotor position value $\hat{\theta}_r$ for the RSMs. Here, instead of the q-inductance $L_q$, the average inductance $$L_\Sigma = \frac{L_d + L_q}{2}$$

multiplied by the current $i_s{}^s$ is subtracted from the estimated flux $\hat{\psi}_s{}^s$, resulting in the so-called fundamental saliency vector $\hat{\psi}_\Delta{}^s$:

$$\hat{\psi}_\Delta^s = \hat{\psi}_s^s - L_\Sigma i_s^s \tag{11}$$

$$\psi_\Delta^r = \frac{(L_d - L_q)}{2} \begin{bmatrix} i_d \\ -i_q \end{bmatrix}. \tag{12}$$

The rotor position may be assigned to the estimated vector $\hat{\psi}_\Delta{}^s$ as follows:

$$\hat{\theta}_r = \frac{1}{2}\arg\left(\begin{bmatrix} i_\alpha \psi_{\Delta\alpha} - i_\beta \psi_{\Delta\beta} \\ i_\alpha \psi_{\Delta\beta} + i_\beta \psi_{\Delta\alpha} \end{bmatrix}\right), \tag{13}$$

It is apparent from equations (12) and (13) that only a minimum of absolute current is necessary here for sufficient signal content, and therefore current operating points on the q-axis are also possible.

The computation of the fundamental saliency vector (equation (11)) and the angular dependency resulting from equation (12), which allows an angle computation according to equation (13), is graphically illustrated in the right-side drawing of FIG. 2 as a vector diagram for the rotor position $\theta_r = 0$.

SUMMARY

Embodiments of the present invention provide for uniquely assigning the magnetic flux linkage to the rotor position of the rotor of a synchronous machine (motor and/or generator). The synchronous machine includes a stator and the rotor with or without permanent magnets. The synchronous machine is actuated by way of clocked terminal voltages and the magnetic flux linkage is calculated from these and the measured current response. In this case, a decisive point of this unique assignment is that the variation of the flux linkage over the rotor rotation, under the boundary of an at least two-dimensional current vector that is unchanged in terms of stator coordinates, is used as key information for the positional assignment. In contrast to previous methods, an assignment based on this variation provides the advantage that it can nevertheless uniquely assign the rotor position even under high loads, in machines with strong magnetic saturation, and irrespective of incorrect current injection, and therefore ensures the stability of the estimation control loop.

A method for use with a synchronous machine having a stator and a rotor with or without permanent magnets is provided. The method includes measuring electric current of the synchronous machine responsive to the synchronous machine being actuated via clocked terminal voltages. The method further includes determining a magnetic flux linkage based on the clocked terminal voltages and the measured electric current. The method further includes using a profile of the magnetic flux linkage as a function of rotation of the rotor, under a boundary condition of an at least two-dimensional electric current vector that is unchanged in coordinates of the stator, to detect a position of the rotor. The method further includes controlling the synchronous machine according to the rotor position.

A device for open-loop and closed-loop control of a polyphase machine including a stator and a rotor is also provided. The device includes a controllable pulse-widthmodulated (PWM) converter for outputting clocked terminal voltages, an apparatus for detecting a number of phase currents, and a controller for actuating the PWM converter. The controller is further configured to perform the method.

A synchronous machine including a stator, a rotor with or without permanent magnets and the device is also provided.

BRIEF DESCRIPTION OF THE DRAWINGS

The following general discussion also pertains to optional embodiments of the present invention. In the Figures.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 3:
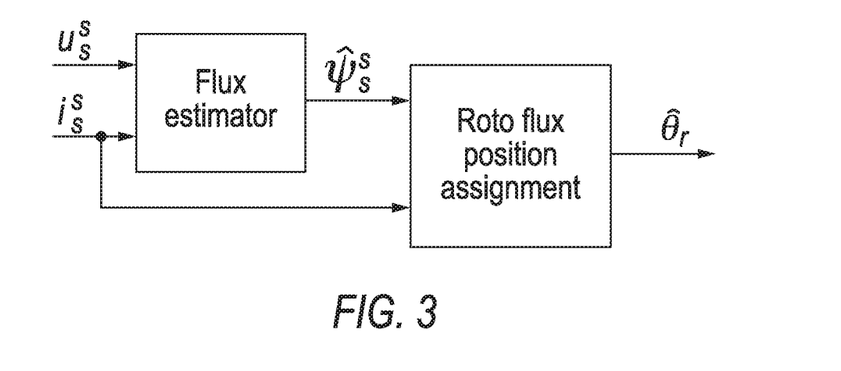
FIG. 3 illustrates a block diagram of the two-stage design of flux-based fundamental wave methods.

In a certain point of view, flux-based fundamental wave methods are generally made up of two stages, which may be separated as illustrated in FIG. 3. The first stage is the flux estimator, whose task is to continuously compute the instantaneous value of the flux vector $\psi_s^s$, which itself is not directly measurable, from the temporal profiles of voltage and current, and to provide this value to the second stage. The second stage assigns (estimates) a rotor position value $\hat{\theta}_r$ to the estimated flux vector $\hat{\psi}_s^s$, considering the instantaneous measured current $i_s^s$, thus precisely encompassing the subject matter of the novelty of the presented method. These interfaces of the second stage rotor position assignment, and thus the clear demarcation from the first stage flux estimator, are illustrated in FIG. 3.

The second stage of flux-based fundamental wave methods, i.e., the rotor flux position assignment, under load may result in ambiguity, and thus instability, of the methods. The reason is that conventional methods for rotor flux position assignment imply the assumption that the inductance values, for example $L_q$ (for active flux), $L_\Sigma$ (for fundamental saliency), or others (for other flux-based methods, see above) that are used in the respective rotor position assignment law, although they have been determined solely for the target operating point (MTPA, for example), are still valid apart from this point. For small currents, this assumption usually holds sufficiently well enough that for current injection at an incorrect angle (due to an estimated position error, for example), the approximately correct rotor position may still be computed. For large currents, however, for certain machine types with a nonlinear flux profile $\psi_s^r(i_s^r)$, fairly large, estimated errors (differences between estimated and actual rotor position) arise for current angles apart from the target point. This is particularly critical when the resulting estimated position error is greater than the causative phase angle error of the current injection, since the estimated error then becomes greater with each cycle, causing the estimation control loop to become unstable. Similar relationships are known from the field of anisotropy-based methods (bibliography reference [25]), where they likewise result in instability of the estimation control loop. In the field of fundamental wave methods, such an analysis and conclusion is not yet available; this is explained in greater detail below.

FIG. 2 shows the vectorial relationships of the active flux approach for the rotor position $\theta_r=0$, where the current $i_s^s=i_s^r$ is adjusted precisely in the target operating point (for example, maximum torque per ampere (MTPA) direction). For this current angle $\angle i_{rs}$, the inductance $L_q(|i_s^r|)$ has been measured beforehand (usually as a function of the absolute current), so that precisely the correct value $L_q$ is now utilized for scaling the vector $L_q*i_s^s$, and the subtraction (equation (7)) computes an active flux $\psi_A^r$ precisely in the a-direction (where it is also present according to $\theta_r=0$ and equation (8)). The assumption from the literature for the active flux concept is that during a rotor rotation, the active flux $\psi_A^s$, as indicated by the dotted-line circle, should move in a circle around the coordinate origin, and that its orientation consequently is equal to the rotor position $\theta_r$, so that the estimated value of the rotor position $\hat{\theta}_r$ may be computed via equation (6). However, this presumes that the value $L_q(|i_s^r|)$ used for the subtraction in equation (7) is also actually valid in the machine, which can apply only if either:

(a) the value $L_q(|i_s^r|)$ has no dependency on the current angle in rotor coordinates $\angle i_s^r$ (not applicable for saturation), or alternatively, if (b) the current angle in actual rotor coordinates $\angle i_{rs}$ is precisely at the target operating point, i.e., the current always revolves fixedly with the rotor.

The latter item (b) is a common (erroneous) assumption in the previous literature for sensor-less closed-loop control, referred to below as a "current fixed in rotor coordinates" condition (rotor frame fixed current, or RFC for short, $i_s^r$=const). Since in sensor-less operation the rotor position is not known per se (in particular for rotor position estimated errors), and the target current value is adjusted in estimated coordinates, it is certainly possible for the current angle in actual rotor coordinates $\angle i_{rs}$ to deviate greatly from the target operating point. A rule for the rotor flux position assignment must be robust against such deviations and the accompanying saturation phenomena (change in the effective $L_q$) in order to ensure the stability of the estimated closed control loop at a certain load $|i_s^r|$.

Figure 4:
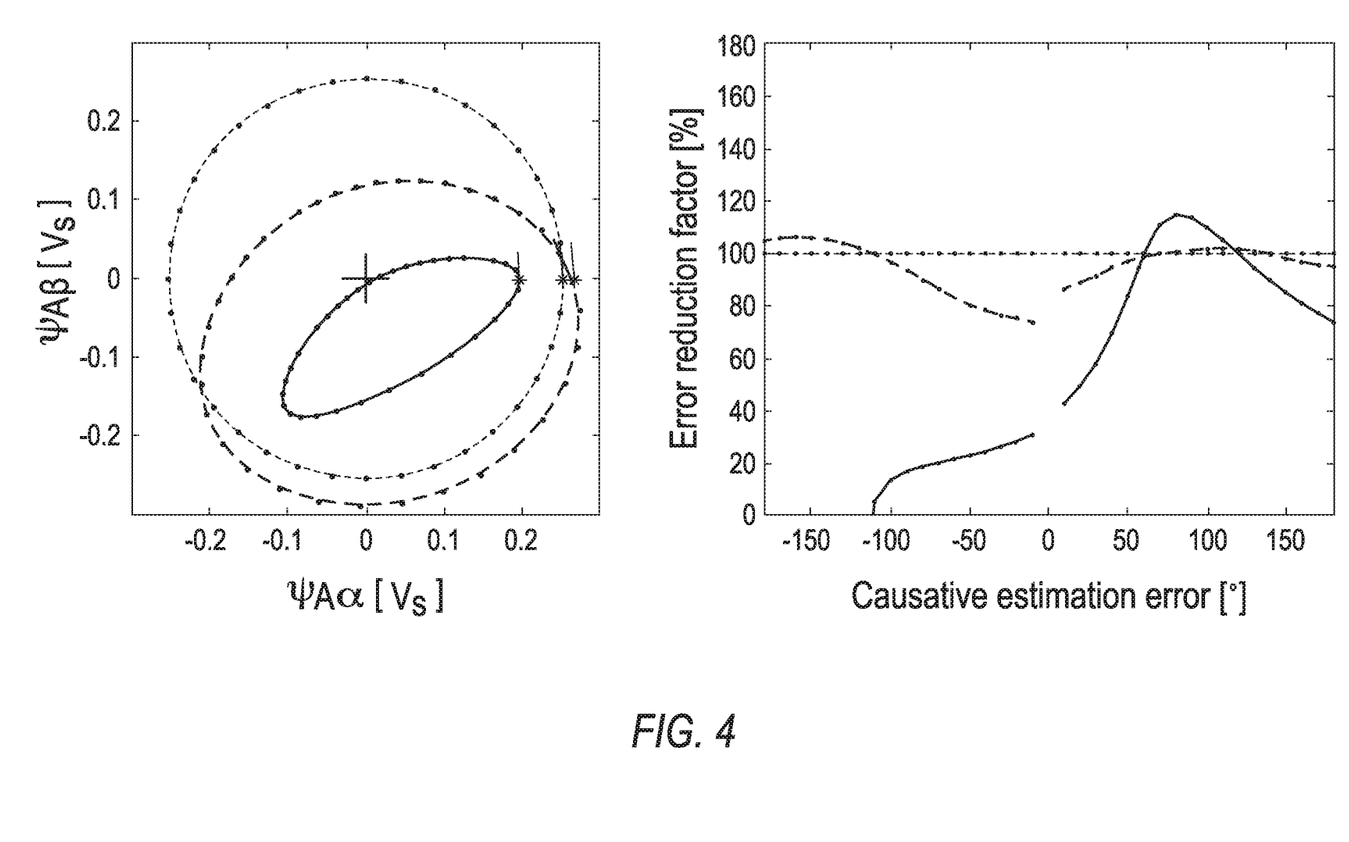
FIG. 4 includes a left-side drawing which illustrates assumed and actual movement of the active flux vector for a strongly saturating PMSM for zero current (dotted line), nominal current (dashed line), and three times the nominal current (solid line) and includes a right-side drawing which illustrates resulting stability properties of the active flux approach for the stated current values.

FIG. 4 shows, using the example of a permanent magnet synchronous machine (PMSM) with strong magnetic saturation, that such robustness is lost with the active flux approach under high currents. In this regard, on the left-side drawing the active flux $\psi_A^s$ is plotted for certain situations in which the current always remains in stator coordinates $i_s^s$ at the target point (i.e., as if the rotor position estimate $\hat{\theta}_r=0$). For the various absolute current values $|i_s^r|=0 \ldots 3i_N$, the asterisks in each case mark the "ideal" active flux $\psi_A^s$ that results when the estimated and the actual rotor positions match ($\hat{\theta}_r=\theta_r=0$), and the current is consequently also controlled to its target point in actual rotor coordinates. In agreement with FIG. 2, the asterisks are all situated on the a-axis. If the rotor were now rotated by 10° ($\theta_r=10°$), the active flux (AF) assumption would likewise expect a 10° rotation of the asterisks about the coordinate origin, as depicted by the straight-line segments extending out from the asterisks. However, since the current angle in rotor coordinates $\angle i_{rs}$, and therefore the saturation state, changes, the actual profile of the active flux $\psi_A^s$ takes a different course, as illustrated in the left-side drawing plot of FIG. 4.

The circular/oval trajectories show the actual profile of the active flux $\psi_A^s$, computed according to equation (7), as a function of an electrical rotor rotation, the points in each case representing a 5° rotor position difference:

$$\theta_r = n5°  \quad (14)$$

The crucial relationship for the development of these essential trajectories (in contrast to the circle assumption in FIG. 2) is that the current does not automatically co-rotate with the rotor position (which is unknown during operation) (RFC, $i_s^r$=const), but, rather, remains unchanged in stator coordinates $i_s^s$. Under this so-called stator frame fixed current (SFC) condition (current fixed in stator coordinates, $i_s^s$=const), which is uncommon in the literature, the pure effect of the rotor movement on the flux $\psi_s^s$ is thus also identifiable from the active flux $\psi_A^s$ alone, i.e., not mixed with a simultaneous change in the current.

The dotted-line SFC trajectory (zero current) in the left-side drawing plot of FIG. 4 extends in an exact circle around the coordinate origin, and the 10° straight line segment (AF assumption) opens precisely into the second 5 point of the SFC trajectory, which means that for zero current, the active flux approach has perfect validity (since for zero current, SRC=RFC applies). For the dashed-line SFC trajectory (nominal current), a difference in magnitude and direction between the active flux assumption and the actual SFC active flux profile is already apparent, and the central circular shape also is no longer present. The difference in direction results in particular in suboptimal signal content and increased susceptibility to interference of the AF position assignment. As a result of the difference in magnitude and the deviation from the circular shape, in particular causative estimated errors and the accompanying current injection apart from the target point lead to a resulting estimated error in the AF position assignment. Thus, the right-side drawing plot in FIG. 4, in the same respective dotted line configuration as in the left-side drawing plot in FIG. 4, shows the particular factor by which a causative estimated error in the active flux computation result is reduced, which at approximately 80% in the case of the dashed-line curves, is not yet critical.

In contrast, for the full SFC trajectory (three times the nominal current), there are major differences between the straight-line segment (AF assumption) and the actual SFC active flux profile, with the special characteristic that the SFC trajectory no longer encompasses the coordinate origin, and therefore the active flux approach can no longer track a full rotor rotation (relative to the current). Thus, the full curve on the right-side drawing of FIG. 4 shows that even small, estimated errors are difficult to further reduce (<30% reduction factor), and larger estimated errors are present even in the region of negative reduction factors (i.e., error intensification), both of which are critical with regard to stability. Also, in practice this PMSM, at three times the nominal current, is not controllable using the active flux approach.

Figure 5:
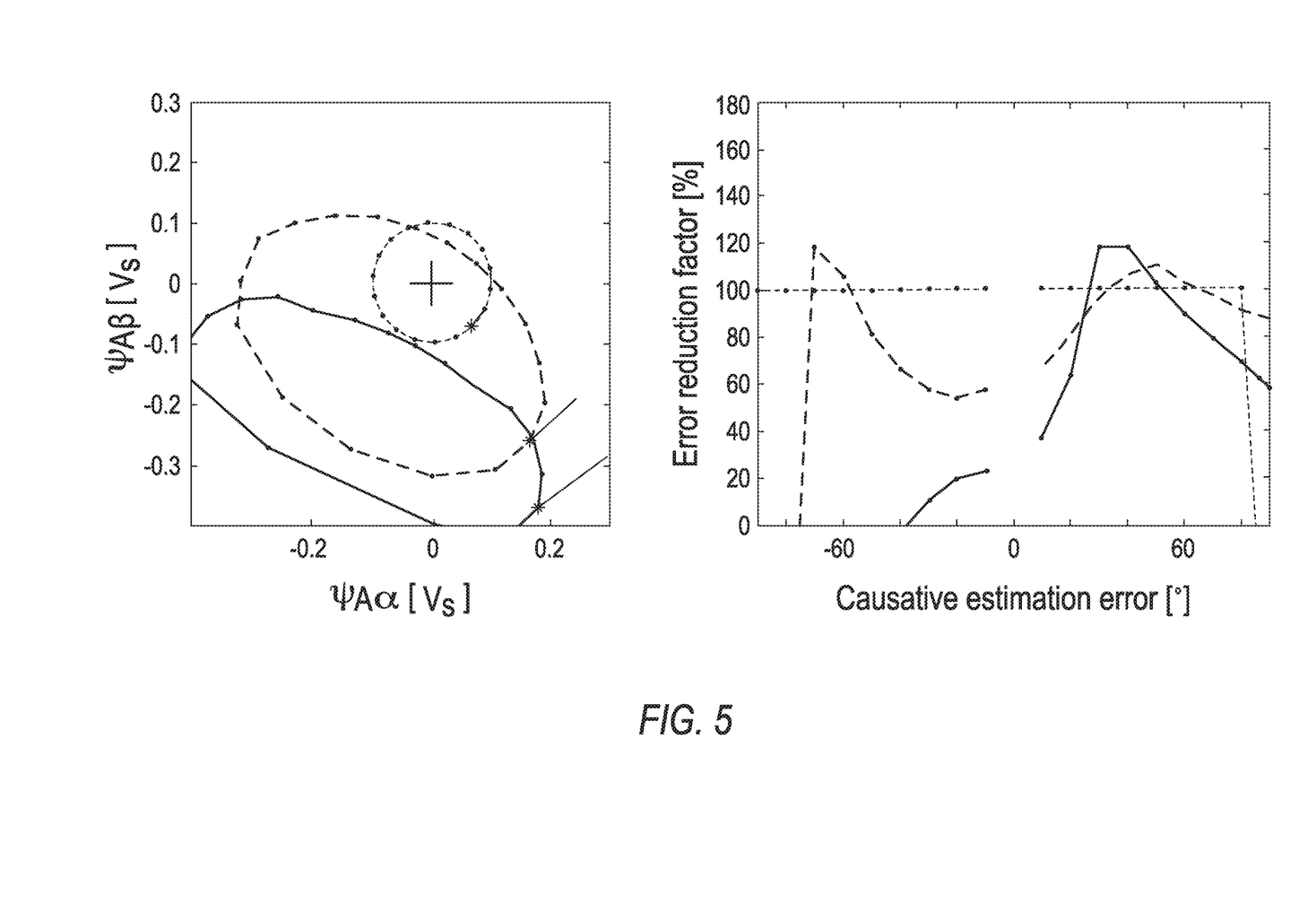
FIG. 5 includes a left-side drawing which illustrates assumed and actual movement of the fundamental saliency vector for a strongly saturating PMSM for ¼ nominal current (dotted line), nominal current (dashed line), and 2.75 times the nominal current (solid line) and includes a right-side drawing which illustrates resulting stability properties of the fundamental saliency approach for the stated current values.

FIG. 5 shows how the same relationships also apply for fundamental saliency (FS), using the example of an RSM with strong magnetic saturation. On the left-side drawing of FIG. 5, the "ideal" points are once again marked by an asterisk in each case, and the 10° FS assumption is marked by a straight-line segment in each case, which due to the evaluation equations of the FS approach (equation (13)) has a different configuration than in FIG. 4. For small currents (¼ the nominal current), the FS approach also provides very good error reduction for all current angles/causative angle errors. However, with increasing current, on the left-side drawing of FIG. 5 it is apparent that the actual SFC FS trajectories do not run uniformly and centrally about a coordinate origin, as assumed for FS, but, rather, after just a few points (positive rotational direction) the actual FS trajectory decreases in its rotational direction and does not encompass the coordinate origin. As a result, on the right-side drawing of FIG. 5 the FS position assignment, for corresponding causative estimated errors, likewise runs into the region of negative error reduction factors, and consequently becomes unstable. Also, in practice this RSM, at 2.75 times the nominal current, is not stably controllable using the FS approach.

Thus, a key component of the present invention is the general conclusion that any rotor flux position assignment whose parameters are valid only under the RFC condition may result in instability of the estimation control loop due to the magnetic saturation of the machine, that is to be operated, above a certain absolute current value. Because EMF methods in the literature use the same RFC parameters, and thus with the same assumptions which are not applicable under saturation, this conclusion may also be transferred to EMF-based methods, and it may thus be generally assumed that all fundamental wave methods in the literature are subject to the above-described stability problem, which may be critical for certain machine types with pronounced magnetic saturation, or certain applications with high magnetic capacity utilization (for example, water-cooled machines in an automotive drive train).

Approach to Achieving the Object of the Present Invention

A basic concept of the presented method, which overcomes the stability problem discussed above, is that precisely the profile of the flux vector as a function of rotor rotation is used as key information for the rotor position assignment, which results when the current in stator coordinates at the same time (during the rotor rotation) remains unchanged (SFC condition, $i_s^s$=const):

$$\psi_1^s(\theta_r) = \psi_s^s(i_1^s, \theta_r) \quad (15)$$

$$= T(\theta_r)\psi_s^r(T(-\theta_r)i_1^s) \quad (16)$$

$$T(\theta) = \begin{bmatrix} \cos\theta & -\sin\theta \\ \sin\theta & \cos\theta \end{bmatrix} \quad (17)$$

$\psi_1^s(\theta_r)$ is the profile of the flux vector $\psi_s^s$ as a function of the rotor rotation that results when the constant current vector is $i_s^s=i_1^s$ is applied. As shown in equation (16), such an SFC profile (equation (15)) may be computed from a conventional rotor-fixed flux map $\psi_s^r(i_s^r)$, using two transformations (equation (17)).

Figure 6:
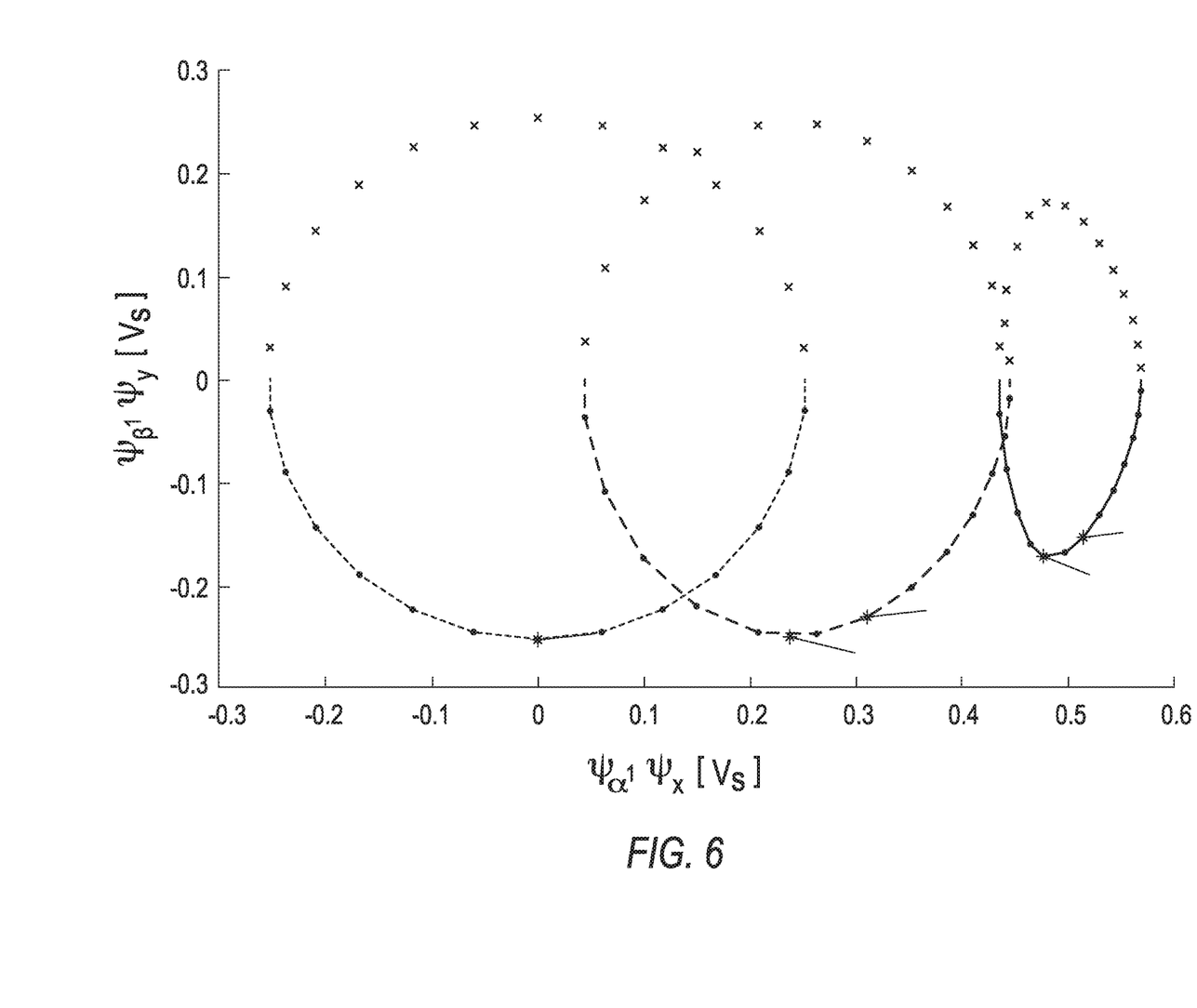
FIG. 6 illustrates an SFC flux profile in stator coordinates $(\alpha, \beta)$ as a function of an electrical rotor rotation for various pure $\alpha$ currents ($i_\beta=0$) and illustrates a current angle-independent flux profile in current coordinates (x, y) for various absolute current values as a function of an electrical rotor rotation for a strongly saturating PMSM with zero current (dotted line), nominal current (dashed line), and three times the nominal current (solid line)

In FIG. 6, three such SFC profiles $\psi_1^s(\theta_r)$, $\psi_2^s(\theta_r)$, and $\psi_3^s(\theta_r)$ are plotted for three different pure α currents $i_1^s$=[0 0]$^T$ (dotted line), $i_2^s$ [$i_N$ 0]$^T$ (dashed line), and $i_3^s$[3$i_N$ 0]$^T$ (solid line), using the example of the same, strongly saturating PMSMs, the points once again marking equidistant rotor position increments. The asterisks mark the respective q-axis current operating point (the respective central point of the lined section) or the MTPA current operating point (the respective lowest point of the trajectory). The extending straight-line segments once again mark the respective AF assumption of the flux profiles under a 10° rotor rotation, which does not occur in particular at high currents. The lined section of each closed SFC trajectory in each case marks the region with a negative rotor position $\theta_r$=−180° . . . 0°, i.e., a positive current angle in rotor coordinates $\theta_{ir}$=0° . . . 180°, i.e., with positive torque $i_s^{rT}J\psi_s^r$>0:

$$\theta_{ir}=\angle i_s^r=\theta_i-\theta_r, \quad (18)$$

Due to the magnetic symmetry of a PMSM, the respective non-lined section of each SFC trajectory (with x points) may be completely computed from the associated lined section via reflection about the d-axis. This reflection reduces the data requirements by a factor of two. However, these trajectories are valid only in stator coordinates $\psi_x^s(\theta_r)$ when the current $i_s^s$ lies exactly on the a-axis. For other current angles in stator coordinates $\theta_i=\angle i_s^s \neq 0$, it would be necessary to correspondingly store/compute further SFC trajectories $\psi_x^s(\theta_r)$.

Therefore, as a particularly advantageous description of the SFC profiles, their representation in current coordinates $\psi_s^i=[\psi_x \ \psi_y]^T$ is introduced, which results from transformation with the current angle $\theta_i=\angle i_s^s$:

$$\psi_s^i = T(-\theta_i)\psi_s^s \quad (19)$$

Neglecting higher flux harmonics (which for many synchronous machines applies sufficiently well):

$$\psi_s^i(|i_s^s|, \theta_{ri}) = \psi_s^s\left(\begin{bmatrix} |i_s^s| \\ 0 \end{bmatrix}, \theta_r\right) \quad (20)$$

Neglecting higher flux harmonics applies here, so that the curves in FIG. 6 likewise represent three SFC flux profiles in current coordinates $\psi_1^i(\theta_{ri})$, $\psi_2^i(\theta_{ri})$, and $\psi_3^i(\theta_{ri})$ as a function of a variable rotor angle in current coordinates:

$$\theta_{ri} = \theta_r - \theta_i = \theta_r - \angle i_s^s \quad (21)$$

$$= -\theta_{ir} = -\angle i_s^r \quad (22)$$

This applies for the three absolute current values zero $|i_s^s|_1$=0, nominal current $|i_s^s|_2=i_N$, or three times the nominal current $|i_s^s|_3$=3 $i_N$ and is valid for all current angles $\theta_i=\angle i_s^s$=−180° . . . 180°. Due to the latter, the data requirements are reduced by several times compared to a description in stator coordinates.

As an alternative to equation (20), the description of the SFC profiles in current coordinates $\psi_s^i(|i_s^s|, \theta_{ri})$ may also be derived from a conventional rotor-fixed flux map $\psi_s^r(i_s^r)$ as follows:

$$\psi_s^i(|i_s^s|, \theta_{ri}) = T(\theta_{ri})\psi_s^r\left(T(-\theta_{ri})\begin{bmatrix} |i_s^s| \\ 0 \end{bmatrix}\right) \quad (23)$$

The determination/measurement in the field are well known.

For the rotor position assignment, a general search is now made for the angular value $\hat{\theta}_{ri}$ that brings the model (equation (23)) into the best possible agreement with the flux measured value $\hat{\psi}_s^i$ that is obtained according to equation (19):

$$\min_{\theta_{ri}} |T(-\angle i_s^s)\hat{\psi}_s^s - \psi_s^i(|i_s^s|, \theta_{ri})|. \quad (24)$$

According to equation (21), the found angular value $\hat{\theta}_r^i$ represents the difference between the rotor position and the current angle $\angle i_s^s$, for which reason the rotor position is assigned after the search (equation (24)) as follows:

$$\hat{\theta}_r = \angle i_s^s + \hat{\theta}_{ri}. \tag{25}$$

It is important that the totality of equations (24) and (25) used for the rotor position assignment require only the flux vector, measured via flux estimator, in stator coordinates $\hat{\psi}_s^s$ and the measured current vector in stator coordinates $i_s^s$ as input variables, and thereby utilize the complete information content of the current vector $i_s^s$ (absolute current value $|i_s^s|$ and current angle $\angle i_s^s$) and dispense with a reduction of the estimated rotor position $\hat{\theta}_r$. This is in contrast to the properties of conventional fundamental wave methods (see above).

As an alternative to the function $\psi_s^i$ ($|i_s^s|$, $\theta_{ri}$), for the minimization (equation (24)) the conventional rotor-fixed flux map $\psi_s^r(i_s^r)$ itself may also be transformed according to equation (23), or any other model computation with the same information content may be used, which in comparison to the use of $\psi_s^i$ ($|i_s^s|$, $\theta_{ri}$) would be disadvantageous primarily with regard to computing time, as shown in the following sections.

Examples of Implementations for Achieving the Object of the Present Invention

The function of the flux in current coordinates $\psi_s^i$ ($|i_s^s|$, $\theta_{ri}$), obtained via equations (20) or (23) or in some other way, is stored, for example, in a two-dimensional table (lookup table (LUT)), in one dimension as a function of the absolute current value $|i_s^s|$, and in the other dimension as a function of the rotor angle in current coordinates $\theta_{ri}$. A value of the flux vector $\psi_s^i$ is then assigned to each such supporting point combination. Starting from this stored model data, in the following five steps as examples, the computed rotor position value $\hat{\theta}_r$ is assigned to a measured flux value $\hat{\psi}_s^s$ (output of the flux estimator) in conjunction with the measured current value $i_s^s$.

In the first step, the angle of the measured current is computed:

$$\theta_i = \arg(i_s^s) \tag{26}$$

The measured flux value $\hat{\psi}_s^s$ is thus transformed $\hat{\psi}_s^i$ according to equation (19) in accordance with current coordinates.

Figure 7:
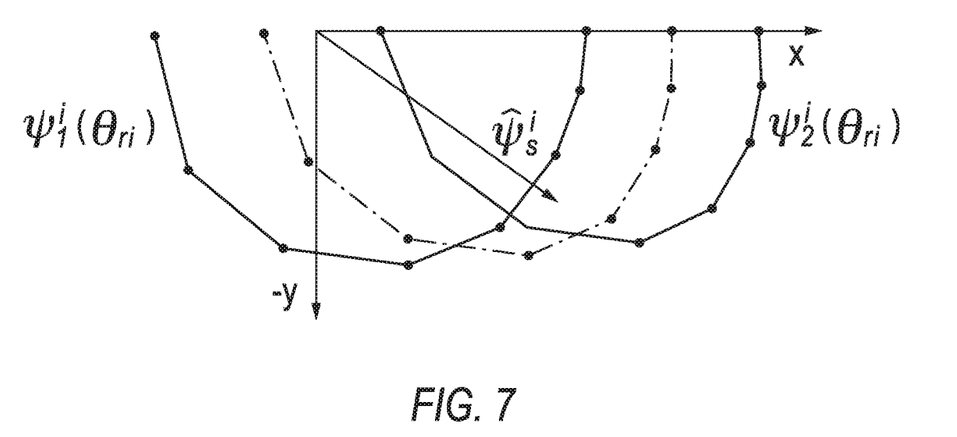
FIG. 7 illustrates a measured flux vector in current coordinates $\hat{\psi}_s^i$ (arrow) compared to the absolute current value-dependent interpolation (dash-dotted line trajectory) between two stored SFC profiles (full trajectories)

Notwithstanding, in the second step the absolute value of the measured current $|i_s^s|$ is computed and used to select the SFC trajectory pair that is valid at that moment from the stored LUT and to interpolate in between, as illustrated in FIG. 7. At that location, the absolute current value is between the supporting points $|i_s^s|_1$ and $|i_s^s|_2$, for example, as the result of which the two surrounding SFC flux profiles $\psi_1^i(\theta_{ri})$ and $\psi_2^i(\theta_{ri})$ are selected from the data of the LUT. The dash-dotted line curve shows the interpolation result that is obtained when the measured absolute current value $|i_s^s|$ is situated approximately centrally between the current supporting points $|i_s^s|_1$ and $|i_s^s|_2$ of the LUT. In this step, either the complete profile is interpolated (entire dash-dotted line curve), or alternatively (for reasons of computing time efficiency and memory efficiency) a search is made only for the current supporting point, and the interpolation ratio is computed (which in the illustrated example is approximately 0.5). In the latter case, which is assumed here by way of example, in the third step only the points that are actually needed are interpolated, which, depending on the search method and the operating point, may in fact be only a very small segment of the dash-dotted line curve.

Figure 8:
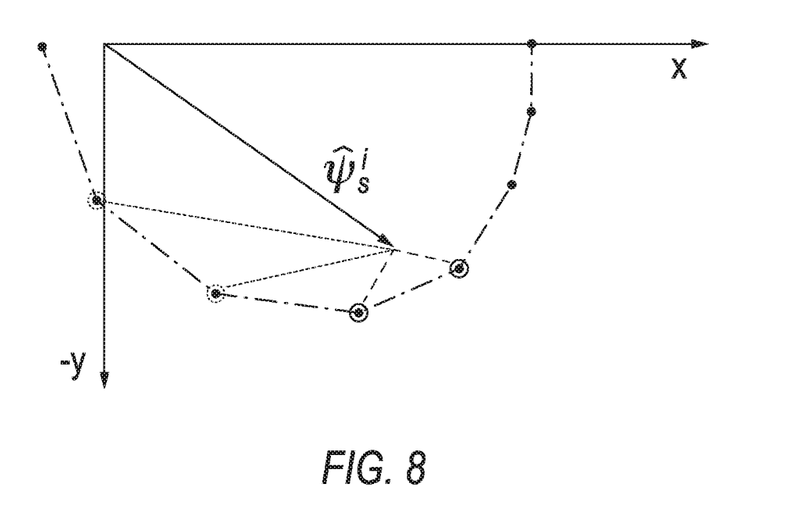
FIG. 8 illustrates an iterative current angle supporting point search on the interpolated trajectory together with the search history (dotted line) and the search result (long-dashed line)

The next, third step is the search for the angle supporting points, as illustrated in FIG. 8. The objective of this step is to find the pair of supporting points of the interpolated trajectory having the smallest distance from the measured flux vector JI. For this purpose, either all distances from all points of the interpolated SFC profile may be determined (global search), or alternatively, an advance may be made in the descending direction until the distance does not become smaller (gradient search). The first option is more computationally intensive than the latter but finding the next point (global optimum) is guaranteed, although it does not necessarily have to be correct, in particular for SFC profiles with intersection points; i.e., the gradient search may actually be technically advantageous here.

Figure 9:
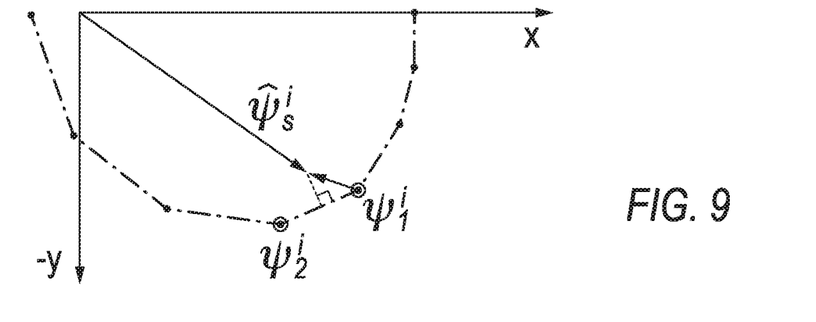
FIG. 9 illustrates a fine assignment of the angular value via projection of the measured flux vector $\hat{\psi}_s^i$ onto the straight line described by the two nearest points.

After the pair of nearest angle supporting points has been selected in the third step, the precise angular value $\theta_{ri}$ may now be interpolated in the fourth step. For this purpose, it is assumed as an example that the two nearest points in FIG. 9 are assigned to the supporting points $\theta_{ri1} = -60°$ (right point) and $\theta_{ri2} = -90°$ (left point). Differential vectors from the first supporting point $\psi_1^i$ to the second supporting point $\psi_2^i$ and to the measured flux $\hat{\psi}_s^i$ are now computed:

$$\Delta\psi_{LUT}^i = \psi_2^i - \psi_1^i \tag{27}$$

$$\Delta\psi_{meas}^i = \hat{\psi}_s^i - \psi_1^i \tag{28}$$

Via the following projection equation, the ratio value $v_\theta$ with which the second supporting point value is to be weighted with respect to the first supporting point value is determined:

$$v_\theta = \frac{\Delta\psi_{meas}^{i\,T} \Delta\psi_{LUT}^i}{\Delta\psi_{LUT}^{i\,T} \Delta\psi_{LUT}^i} \tag{29}$$

The multiplication of a transposed column vector by a column vector results in a scalar product. In the example of FIG. 9 this ratio would be $v_\theta = 0.4$, with which an angular value is assigned in the fifth step and the last step as follows.

The angle supporting point values $\theta_{ri1}$ and $\theta_{ri2}$ are weighted relative to one another with $v_\theta$ in order to compute the rotor angle in current coordinates $\theta_{ri}$:

$$\hat{\theta}_{ri} = \theta_{ri1} + v_\theta(\theta_{ri2} - \theta_{ri1}) \tag{30}$$

In the example from FIG. 9, consequently $-72°$ is then added to the current angle computed beforehand in equation (26) to obtain the computed rotor position:

$$\hat{\theta}_r = \theta_i + \hat{\theta}_{ri}. \tag{31}$$

Because each of these steps is based on unambiguous measured variables ($|i_s^s|$, $|\theta_i|$, and/or $\psi_s^s$), and contains no assumptions with regard to rotor position or current operating point, this rotor position assignment rule is completely linear, generally stable, and accurate in all current operating points, i.e., even apart from the target current trajectory (MTPA, for example), which may be advantageous in the field weakening area, among others, compared to methods of the literature.

As shown in FIGS. 7, 8, and 9, only SFC flux profiles that are valid for one-half the possible/relevant rotor angles in current coordinates $\theta^{ri1} = [-180° \ldots 0°]$ have to be stored in the LUT, since for the remaining angular range $\theta_{ri1} = [0° \ldots 180°]$ the SFC flux profiles are symmetrical (see FIG. 6) and may thus be constructed from the stored data as described as follows.

Figure 10:
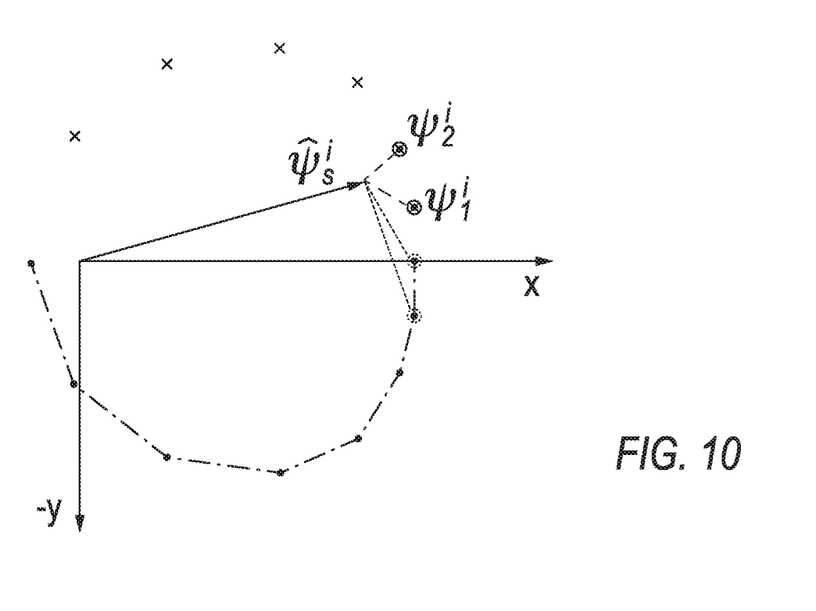
FIG. 10 illustrates an angle supporting point search in the region of negative current angles via reflection of the data of positive current angles $\theta_{i^r}$.

The reflection takes place solely in the third step above, i.e., in the search for the angle supporting points; all other steps remain unaffected. FIG. 10 shows an example of how a flux value in current coordinates $\hat{\psi}_s^i$ with a positive y-component has been measured. In this case, the angle supporting point search reduces the distance in which it advances to the upper right, i.e., at smaller angles $\theta_{ri}$, until it ultimately arrives at the end of the stored supporting points for the supporting point index 0 on the x-axis. From there, the search is further continued into the region of negative indices, a reflection being implemented by means of the following symmetry rules:

1. Negative index values are translated into positive values for addressing the LUT: for example, $-1 \rightarrow +1$
2. The associated x-flux component $\psi_x$ of the supporting point is directly used: for example, $+0.3$ Vs $\rightarrow +0.3$ Vs
3. The associated y-flux component $\psi_y$ of the supporting point is negated: for example, $-0.1$ Vs $\rightarrow +0.1$ Vs
4. The associated angular value $\psi_{ri}$ of the supporting point is negated: for example, $-30° \rightarrow +30°$.

In this way, as illustrated in FIG. 10, on the virtual trajectory indicated by the "x" symbols a further search is made for the nearest pair of supporting points, and the indices $-2$ and $-1$ having the angular values $\theta^{ri1}=+60°$ (top encircled "x") and $\theta_{ri2}=+30°$ (bottom encircled "x") are found. This pair having the associated (reflected) flux values $\psi_{s1}{}^i$ and $\psi_{s2}{}^i$ then forms the starting point for the above fourth step, the interpolation of the angular value $\hat{\theta}_{ri}$, which takes place regardless of the reflection that occurred, in an identical manner to that described above.

For synchronous machine types without permanent flux (RSMs, for example), the symmetry interval is shortened to $\theta_{r1}=[-90° \ldots 0°]$. In general, regardless of the length of the symmetry interval, only the data of this interval itself need to be stored, and during operation outside this point may be reflected using the same rules described above.

Temperature Compensation

Due to the fact that upon a temperature increase of the rotor, the PM flux reversibly decreases (up to 10-20%, depending on the PM material), magnetic relationships that are important for the position assignment (for PMSM, for example) also change. This section explains how a corresponding compensation rule is possible. It is particularly advantageous that this compensation approach manages without measured data from a hot machine, since heating up of the machine represents a particularly demanding, tedious portion of the process of starting up sensor-less operation that is not always possible.

As a starting point for compensation without hot data, the collapse of the SFC flux profiles in current coordinates is used, which in these coordinates has a particularly simple design (for example, compared to the much more complex temperature-related change of conventional flux maps).

The basic concept for the simplest possible modeling of the temperature behavior for enabling a compensation rule is the assumption that the collapse center may be approximately described by a point on the x-axis whose x-component is the same as that of the q-axis operating point (the right asterisk of each trajectory in FIG. 6).

$$\psi^i_{clps} = \begin{bmatrix} \psi_x(|i^s_s|, 90°) \\ 0 \end{bmatrix} \tag{32}$$

Thus, when the temperature changes, a shift of each stored flux point flux point takes place on the straight lines described by it and the collapse center (equation (32)). This shift may occur proportionately to the change of the PM flux.

For some PM machines, for simplification it may be assumed, for example, that the degree of the collapse $v_{clps}$ is scaled to the instantaneous value of the PM flux $\psi_{PM}$ $$\psi^i_{sh} = \psi^i_{clps} + v_{clps}(\psi^i_s - \psi^i_{clps}) \tag{33}$$

$$v_{clps} = \frac{\psi_{PM}}{\psi_{PM0}} \tag{34}$$

$\psi_{PM0}$ is the PM flux value at which the stored SFC profiles have been measured, and $\psi_{sh}{}^i$ represents the temperature-compensated value of the stored model value $\psi_s{}^i$ that is correspondingly entered into equation (24) or equations (27) and (28) for the position assignment. On this basis, a tracked PM flux value $\psi_{PMtrk}$ (if present via other methods) may be used instead of $\psi_{PM}$ in equation (34) to compute the instantaneous degree of collapse $v_{clps}$, and to thus allow temperature compensation of the position assignment by use of equation (33).

As an alternative to scaling of the model SFC profile points, the measured flux value $\hat{\psi}_s{}^i$ may also be inversely scaled:

$$\hat{\psi}_{sh}{}^i = \psi_{clps}{}^i + v_{clps}{}^{-1}(\hat{\psi}_s{}^i - \psi_{clps}{}^i), \tag{35}$$

In the rotor position assignment according to equations (24) and (25) or equations (27) through (31) an identical result $\hat{\theta}_r$ is given, as required for an adaptation of the model SFC profile points, but with much less computing time. This inverse scaling of the measured flux value is also possible based on a tracked PM flux value $\psi_{PMtrk}$.

Figure 11:
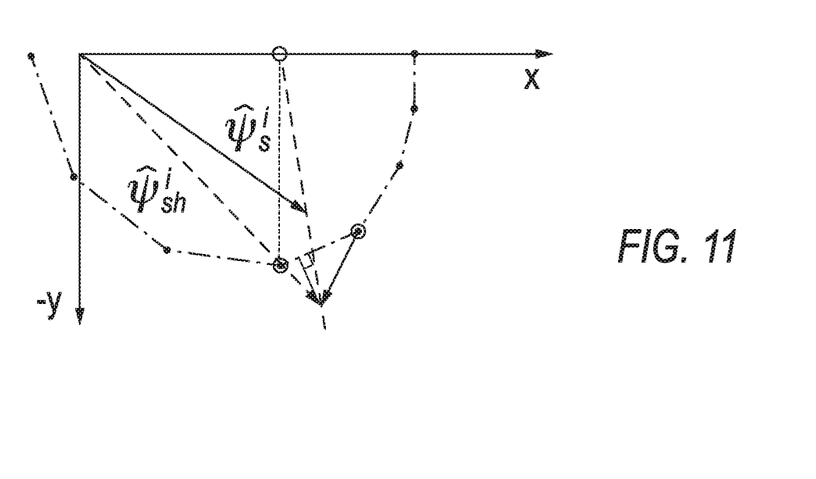
FIG. 11 illustrates temperature tracking by scaling of the measured flux vector $\hat{\psi}_s^i$, starting from the collapse center (circle on the x-axis) and going toward the scaled flux vector $\hat{\psi}_{sh}^i$, the scaling taking place as a function of the orthogonal projection component (orthogonal line on the trajectory)

As an alternative to $\psi_{PMtrk}$, some other information source may be used to determine the scaling factor $v_{clps}$: the component orthogonal to the position information, which by definition is free of position information, while the collapse occurs primarily in this direction. The orthogonal component is illustrated in FIG. 11 by the short line (situated perpendicularly on the SFC curve), and results mathematically when in equation (29) the scaled measured value $\hat{\psi}_{sh}{}^i$ is used, and a cross product is used instead of the scalar product:

$$\Delta \psi^i_{meash} = \hat{\psi}^i_{sh} - \psi^i_{s1} \tag{36}$$

$$e_h = \frac{\Delta \psi^{iT}_{meash} J \Delta \psi^i_{LUT}}{\Delta \psi^{iT}_{LUT} \Delta \psi^i_{LUT}} \tag{37}$$

In the event that the scaled measured vector $\hat{\psi}_{sh}{}^i$ is outside the interpolated trajectory, $e_h$ is positive, and the scaling factor $v_{clps}$ or alternatively the PM tracking value $\psi_{PMtrk}$ must be increased, and vice versa. This may be used to derive the following law for adapting the scaling factor $v_{clps}$ itself, or alternatively for the PM flux tracking:

$$\frac{dv_{clps}}{dt} = k_v e_h \tag{38}$$

$$\frac{d\psi_{PMtrk}}{dt} = k_{trkPM} e_h \tag{39}$$

The particular tracking bandwidth may be set using the gain values $k_v$ or $k_{trkPM}$.

Experimental Results

Figure 12:
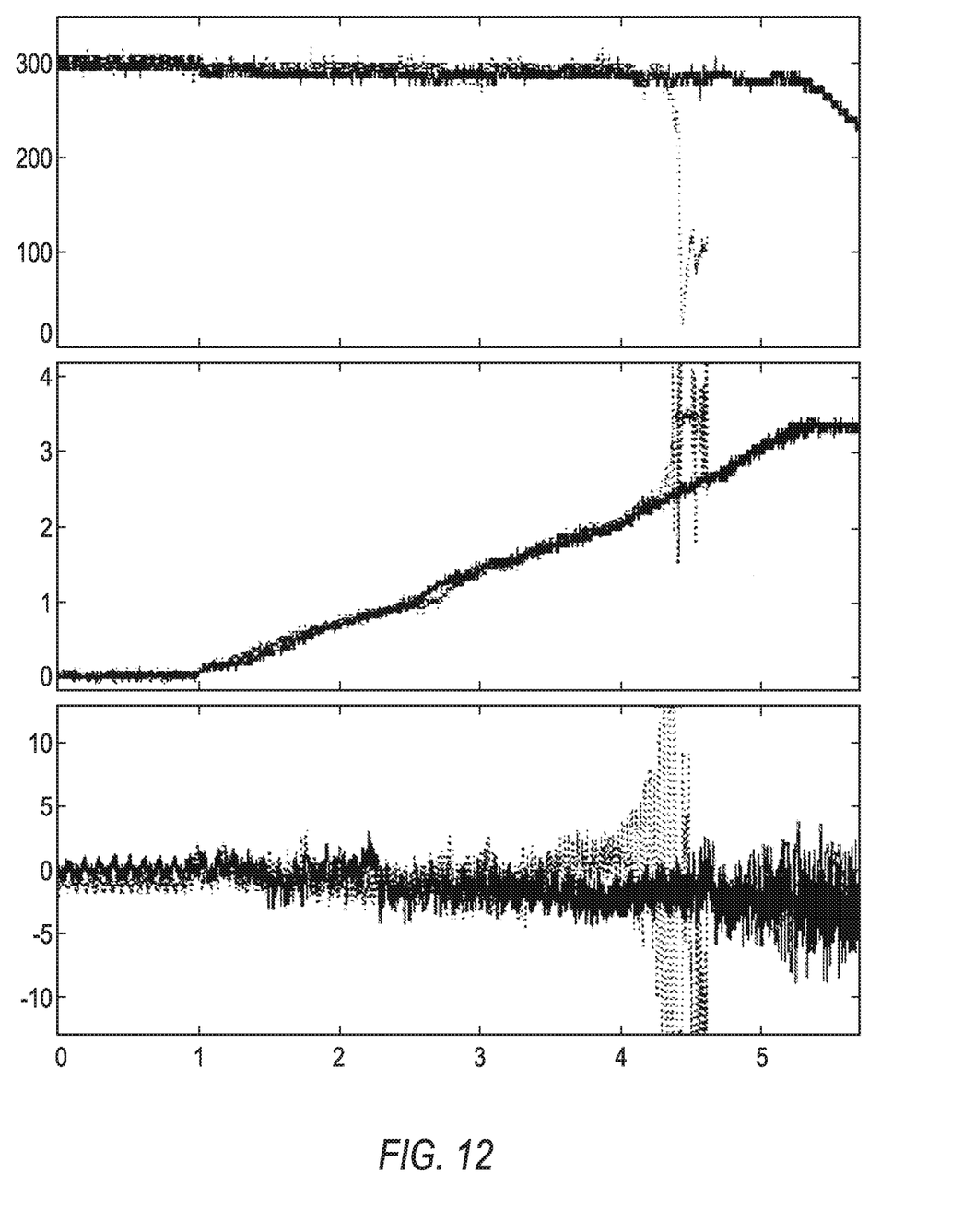
FIG. 12 illustrates experimental results of the presented method (solid line graphs) compared to the active flux method (dotted line graphs), using the example of sensor-less rotational speed-controlled PMSMs during a load ramp and includes a top-side drawing which illustrates a measured rotational speed in rad/s (electrical), a center-side drawing which illustrates a measured absolute current value based on nominal current, and a bottom-side drawing which illustrates an estimated position error in electrical degrees, wherein all graphs are plotted as a function of time in seconds.
Figure 13:
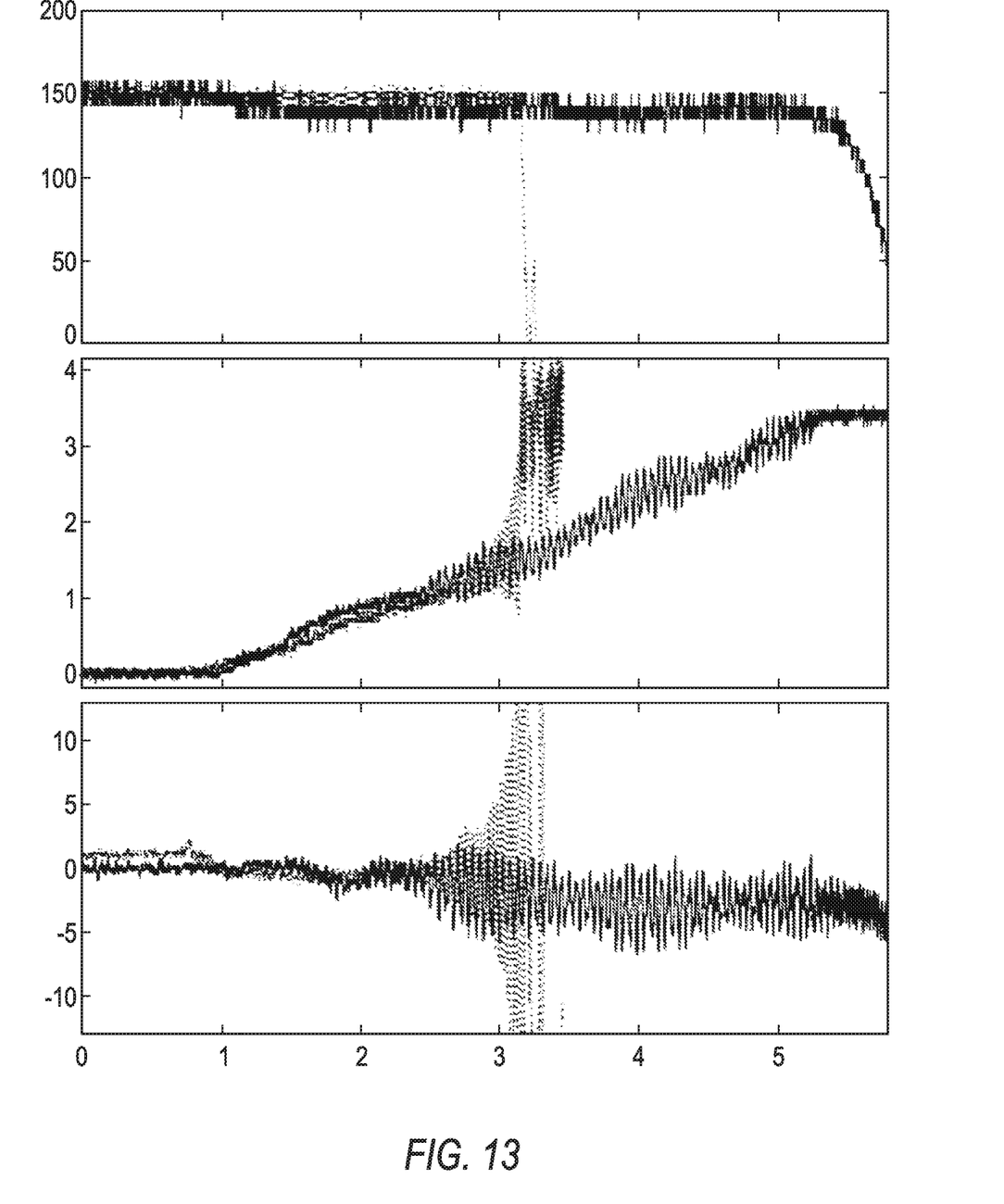
FIG. 13 illustrates experimental results of the presented method (solid line graphs) compared to the fundamental saliency method (dotted line graphs), using the example of sensor-less rotational speed-controlled RSMs during a load ramp and includes a top-side drawing which illustrates a measured rotational speed in rad/s (electrical), a center-side drawing which illustrates a measured absolute current value based on nominal current, and a bottom-side drawing which illustrates an estimated position error in electrical degrees, wherein all graphs are plotted as a function of time in seconds.

The following measuring results were obtained using the same PMSMs and RSMs that were also used for the derivation. FIG. 12 shows the results of the presented method (solid line) and of the active flux method (dotted line) for the PMSMs. FIG. 13 shows the results of the presented method (solid line) and of the fundamental saliency method (dotted line) for the RSMs.

Both machines are involved in sensor-less rotational speed control; i.e., the position estimate is used for Park transformation of the current control and differentiated with respect to time for reducing the rotational speed. A connected sensor is used solely for computing the estimated error and for representing the actual rotational speed in FIGS. 12 and 13, in each case at the top. The rotational speed target value, at $$300 \frac{\text{rad}}{s}$$

for the PMSMs and $$150 \frac{\text{rad}}{s}$$

for the RSMs, in each case is in a range where the position estimation takes place based solely on the fundamental wave method. For the first second of each measurement, the machines rotate at idling speed. By use of a load machine, an increasing load torque is subsequently applied, which after approximately five seconds results in the set current limitation of approximately 3.4 times the nominal current being reached in both machines. Because the load torque is still further increasing, the rotational speed subsequently decreases at the end.

For the PMSMs, the estimated errors of both methods remain below three electrical degrees up to approximately t≤4s and $|i_s^s|$≤$2i_N$. With the active flux method, an intensifying oscillation subsequently develops, and the method shifts into the region of negative estimated errors (see FIG. 4). Due to the estimated errors and the resulting incorrect current angle, the absolute current generates less torque. As a result, in the active flux method the rotational speed decreases, whereupon the rotational speed controller responds with a quickly rising absolute current value which, however, due to the incorrect current angle also can no longer counteract the load torque. In contrast, the presented method with unambiguous rotor flux position assignment also retains fewer estimated errors, does not shift away, and may therefore counteract the increasing load torque until the current limitation of 3.4 $i_N$ is reached, and maintain the target rotational speed.

For the RSMs, the estimated errors remain below three electrical degrees only up to approximately t≤2.5 s and is $|i_s^s|$≤$i_N$. Also with the fundamental saliency method, an intensifying oscillation subsequently develops, and the method likewise shifts into the region of negative estimated errors (see FIG. 5). Here as well, due to the resulting torque reduction the rotational speed decreases, and the absolute current value quickly rises via the rotational speed controller, without affecting the rotational speed. In this case as well, the presented method with unambiguous rotor flux position assignment once again retains fewer estimated errors (this time with pronounced harmonics of approximately two-three electrical degrees), does not shift away, and may thus counteract the increasing load torque until the current limitation of 3.4 $i_N$ is reached, and maintain the target rotational speed.

In summary, the presented method with unambiguous rotor flux position assignment, in contrast to the conventional fundamental wave methods, has generally been shown to be stable and capable of sensor-less control of high overloads, even for highly nonlinear machines.

Further aspects relate to:

(i) a device for open-loop and closed-loop control of a polyphase machine comprising a stator and a rotor, including a unit for detecting the number of phase currents, and including a controller for actuating the PWM converter, which is configured and designed to carry out the method as described above; and (ii) a synchronous machine comprising a stator and a rotor with or without permanent magnets and including a device for open-loop and/or closed-loop control as described in item (i).

BIBLIOGRAPHY

[1] R. Wu and G. R. Slemon, "A permanent magnet motor drive without a shaft sensor," IEEE Transactions on Industry Applications, pp. 1005-1011, September 1991.

[2] T. Furuhashi, S. Sangwongwanich, and S. Okuma, "A position-and-velocity sensorless control for brushless DC motors using an adaptive sliding mode observer," IEEE Transactions on Industrial Electronics, pp. 89-95, April 1992.

[3] S. Bolognani, R. Oboe, and M. Zigliotto, "Sensorless full-digital PMSM drive with EKF estimation of speed and rotor position," IEEE Transactions on Industrial Electronics, pp. 184-191, February 1997.

[4] T. Endou, H. Fujii, H. Miura, K. Sakamoto, and N. Takahashi, "Method of estimating a rotor position of synchronous motor, method of controlling synchronous motor with no position sensor and a controller of synchronous motor," EP Patent No. 1133050 B1, Mar. 6, 2000.

[5] E. Y. Y. Ho, "Rotor angle estimation for permanent magnet synchronous motor drive," U.S. Pat. No. 6,910,389 B2, Nov. 12, 2001.

[6] Z. Chen, M. Tomita, S. Doki, and S. Okuma, "An extended electromotive force model for sensorless control of interior permanent-magnet synchronous motors," IEEE Transactions on Industrial Electronics, pp. 288-295, April 2003.

[7] S. Ichikawa, M. Tomita, S. Doki, and S. Okuma, "Sensorless Control of Synchronous Reluctance Motors Based on Extended EMF Models Considering Magnetic Saturation With Online Parameter Identification," IEEE Transactions on Industry Applications, pp. 1264-1274, September 2006.

[8] L. Cardoletti, T. Bieler, C. Koechli, and C. Fleury, "Sensorless technology, estimation of sampled back EMF voltage values and/or the sampled inductance values based on the pulse width modulation periods," EP Patent No. 2036197 B1, Jul. 5, 2006.

[9] I. Boldea, M. C. Paicu, and G. Andreescu, "Active Flux Concept for Motion-Sensorless Unified AC Drives," IEEE Trans. on Power Electronics, vol. 23, pp. 2612-2612, 2008.

[10] A. Eilenberger and M. Schroedl, "Extended back EMF model for PM synchronous machines with different inductances in d- and q-axis," in 13th International Power Electronics and Motion Control Conference, Poznan, 2008.
[11] P. Landsmann, R. Kennel, H. W. de Kock, and M. J. Kamper, "Fundamental saliency based encoderless control for reluctance synchronous machines," pp. 1 7, IEEE Conf. ICEM 2010.
[12] M. Veijanen, "Method and apparatus for estimating rotor angle of synchronous reluctance motor," EP Patent No. 2493067 B1, Feb. 22, 2011.
[13] M. Schrodl, "Detection of the rotor position of a permanent magnet synchronous machine at standstill," IEEE Conf. ICEM, p. 51-56, 1988.
[14] P. L. Jansen and R. D. Lorenz, "Transducerless position and velocity estimation in induction and salient AC machines," IEEE Trans. on Industrial Applications, Vol. 31, p. 240-247, 1995.
[15] P. Landsmann, D E Patent No. 10 2015 217 986 A1, 2015.
[16] M. J. Corley and R. D. Lorenz, "Rotor position and velocity estimation for a salient-pole permanent magnet synchronous machine at standstill and high speeds," IEEE Trans. on Industrial Applications, vol. 34, p. 784-789, 1998.
[17] A. Piippo, "Method in salient-pole permanent magnet synchronous machine," EP Patent No. 1513250 81, Sep. 5, 2003.
[18] J. Quirion, "Position sensorless drive for permanent magnet synchronous motors," U.S. Pat. No. 7,026,772, Jan. 14, 2004.
[19] M. Schroedl, M. Hofer, and W. Staffier, "Combining INFORM method, voltage model and mechanical observer for sensorless control of PM synchronous motors in the whole speed range including standstill," W. Elektrotech. Inftech., p. 183-19, May 2006.
[20] F. Götz and V. Barinberg, "System for seamless velocity and/or location determination, including standstill, for a permanent magnet rotor of an electric machine," EP Patent No. 2023479 B1, Aug. 6, 2007.
[21] W. Hammel, M. Hartmann and H. Wolf, "Method for determining the rotor position of a synchronous machine that is operated on a field-oriented basis," EP Patent No. 2474091 B1, Sep. 2, 2009.
[22] S. Agarlita, L Boldea, and B. F., "High-Frequency-Injection-Assisted 'Active-Flux'-Based Sensorless Vector Control of Reluctance Synchronous Motors, With Experiments From Zero Speed," IEEE Transactions on Industry Applications, pp. 1931-1939, November 2012.
[23] F. Demmelmayr, M. Susic, and M. Schroedl, "Sensorless control at high starting torque of a 4000 Nm traction drive with permanent magnet synchronous machine," in 14th European Conference on Power Electronics and Applications, Birmingham, 2011.
[24] S. Shinnaka, "Vector control method for synchronous reluctance motor," U.S. Pat. No. 6,339,308 B2, Mar. 17, 2000.
[25] W. Hammel, P. Landsmann, and R. M. Kennel, "Operating point dependent anisotropies and assessment for position-sensorless control," in EPE/ECCE Europe, Karlsruhe, 2016.
[26] R. Joetten and G. Maeder, "Control Methods for Good Dynamic Performance Induction Motor Drives Based on Current and Voltage as Measured Quantities," IEEE Transactions on Industry Applications, IA-19(3), pp. 356-363, 1983.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for use with a synchronous machine having a stator and a rotor with or without permanent magnets, the method comprising:
    measuring electric current of the synchronous machine responsive to the synchronous machine being actuated via clocked terminal voltages;
    determining a magnetic flux linkage based on the clocked terminal voltages and the measured electric current;
    storing multiple profiles of the magnetic flux linkage as a function of rotation of the rotor in a model for different electric current values, from which a profile is selected according to the measured electric current;
    using the selected profile of the magnetic flux linkage as a function of rotation of the rotor, under a boundary condition of an at least two-dimensional electric current vector that is unchanged in coordinates of the stator, to detect a position of the rotor, wherein only the magnetic flux linkage and the electric current vector, and the stored profiles of the magnetic flux linkage, are used for detecting the position of the rotor, and the position of the rotor is neither directly nor indirectly fed back to detect a subsequent position of the rotor; and
    controlling the synchronous machine according to the rotor position.

2. The method according to claim 1 further comprising:
    transforming the magnetic flux linkage from a coordinate system fixed to the stator into a coordinate aligned with an electric current angle.

3. The method according to claim 1 further comprising:
    storing, for an electric current value, the profile of the magnetic flux linkage over either an entire electrical rotor rotation or a shorter interval that allows, as a result of symmetrical conditions, the profile of the magnetic flux linkage over the entire electrical rotor rotation to be computed.

4. The method according to claim 1 further comprising:
    in detecting the position of the rotor, determining a point or pair of points that has a smallest distance from the magnetic flux linkage from the profile of the magnetic flux linkage.

5. The method according to claim 4 wherein:
    the detected position of the rotor results from a weighted sum of position values of the nearest pair of points.

6. The method according to claim 5 wherein:
    a weighting of the weighted sum results from a projection of the magnetic flux linkage onto a straight line that is described by the nearest pair of points.

7. The method according to claim 1 wherein:
    an influence of an increase in rotor temperature on the profile of the magnetic flux linkage is modeled as a shift of each profile point on a straight line, which is described by the profile point and a second point whose abscissa value is the point of a profile curve with zero d-current and whose ordinate value is zero.

8. The method according to claim 7 further comprising:
    computing, for temperature tracking of rotor position assignment, the shift of the profile points as a function of a tracked parameter of the magnetic flux linkage.

9. The method according to claim 7 further comprising:
computing, for temperature tracking of rotor position assignment, the shift of the profile points as a function of a cross product from two differential vectors, a first one of the differential vectors resulting as a difference between the magnetic flux linkage and one of the two nearest profile points, and a second one of the differential vectors resulting as a difference between the two nearest profile points.

10. A device for open-loop and closed-loop control of a polyphase machine including a stator and a rotor, the device comprising a controllable pulse-width-modulated (PWM) converter for outputting clocked terminal voltages, an apparatus for detecting a number of phase currents, and a controller for actuating the PWM converter, wherein the controller is configured to perform the method of claim 1.

11. A synchronous machine, comprising a stator, a rotor with or without permanent magnets, and the device of claim 10.

12. A method for use with a synchronous machine having a stator and a rotor with or without permanent magnets, the method comprising:
measuring electric current of the synchronous machine responsive to the synchronous machine being actuated via clocked terminal voltages;
determining a magnetic flux linkage based on the clocked terminal voltages and the measured electric current;
using a profile of the magnetic flux linkage as a function of rotation of the rotor, under a boundary condition of an at least two-dimensional electric current vector that is unchanged in coordinates of the stator, to detect a position of the rotor;
in detecting the position of the rotor, determining a point or pair of points that has a smallest distance from the magnetic flux linkage from the profile of the magnetic flux linkage; and
controlling the synchronous machine according to the rotor position.

13. The method according to claim 12 wherein:
the detected position of the rotor results from a weighted sum of position values of the nearest pair of points.

14. The method according to claim 13 wherein:
a weighting of the weighted sum results from a projection of the magnetic flux linkage onto a straight line that is described by the nearest pair of points.

15. The method according to claim 12 further comprising:
storing multiple profiles of the magnetic flux linkage as a function of the rotor rotation in a model for different electric current values, from which a profile is selected according to the measured electric current, by which the position of the rotor is detected.

16. The method according to claim 15 wherein:
only the magnetic flux linkage and the electric current vector, and the stored profiles of the magnetic flux linkage, are used for detecting the position of the rotor, and the position of the rotor is neither directly nor indirectly fed back to detect a subsequent position of the rotor.

17. A method for use with a synchronous machine having a stator and a rotor with or without permanent magnets, the method comprising:
measuring electric current of the synchronous machine responsive to the synchronous machine being actuated via clocked terminal voltages;
determining a magnetic flux linkage based on the clocked terminal voltages and the measured electric current;
using a profile of the magnetic flux linkage as a function of rotation of the rotor, under a boundary condition of an at least two-dimensional electric current vector that is unchanged in coordinates of the stator, to detect a position of the rotor; and
controlling the synchronous machine according to the rotor position; and
wherein an influence of an increase in rotor temperature on the profile of the magnetic flux linkage is modeled as a shift of each profile point on a straight line, which is described by the profile point and a second point whose abscissa value is the point of a profile curve with zero d-current and whose ordinate value is zero.

18. The method according to claim 17 further comprising:
computing, for temperature tracking of rotor position assignment, the shift of the profile points as a function of a tracked parameter of the magnetic flux linkage.

19. The method according to claim 17 further comprising:
computing, for temperature tracking of rotor position assignment, the shift of the profile points as a function of a cross product from two differential vectors, a first one of the differential vectors resulting as a difference between the magnetic flux linkage and one of the two nearest profile points, and a second one of the differential vectors resulting as a difference between the two nearest profile points.

20. The method according to claim 17 further comprising:
storing multiple profiles of the magnetic flux linkage as a function of the rotor rotation in a model for different electric current values, from which a profile is selected according to the measured electric current, by which the position of the rotor is detected.

* * * * *